(12) United States Patent
Maruyama (10) Patent No.: US 10,513,071 B2
(45) Date of Patent: Dec. 24, 2019

(54) PRESSURE CONTROLLER FOR INJECTION MOLDING MACHINE

(71) Applicant: FANUC Corporation, Yamanashi (JP)

(72) Inventor: Junpei Maruyama, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 86 days.

(21) Appl. No.: 15/060,134

(22) Filed: Mar. 3, 2016

(65) Prior Publication Data

US 2016/0257047 A1 Sep. 8, 2016

(30) Foreign Application Priority Data

Mar. 4, 2015 (JP) ................................. 2015-042809

(51) Int. Cl.
*B29C 45/77* (2006.01)
*B29C 45/00* (2006.01)
(Continued)

(52) U.S. Cl.
CPC .......... *B29C 45/77* (2013.01); *B29C 45/0025* (2013.01); *B29C 45/1774* (2013.01);
(Continued)

(58) Field of Classification Search
CPC . B29C 45/77; B29C 45/0025; B29C 45/1774; B29C 45/50; B29C 45/768; B29C 2945/76187; B29C 2945/76381; B29C 2945/76498; B29C 2945/76862; B29C 2945/76665; B29C 2945/76859; B29C 2945/76969; B29C 2045/776;
(Continued)

(56) References Cited

U.S. PATENT DOCUMENTS 6,416,694 B1 7/2002 Ishikawa
8,860,355 B2 * 10/2014 Ueda ...................... B30B 15/14
318/560
(Continued)

FOREIGN PATENT DOCUMENTS

AT 007473 U1 4/2005
JP 59-214629 A 12/1984
(Continued)

OTHER PUBLICATIONS

Machine Translation of JP-09277325-A (Year: 1997).*
(Continued)

*Primary Examiner* — Leith S Shafi
(74) *Attorney, Agent, or Firm* — Hauptman Ham, LLP (57) ABSTRACT

A pressure controller for an injection molding machine capable of reducing variations of pressure in a mold in molding cycles and providing molded articles of stable quality is provided. The pressure controller includes an in-mold pressure estimation unit for estimating a pressure in the mold based on an injection pressure detected with an injection pressure detection unit, and an amount of movement of a screw detected with a screw movement amount detection unit, and an in-mold pressure control unit for controlling such that the estimated in-mold pressure becomes a set in-mold pressure after the pressure control is performed in a dwell step with an injection pressure control unit.

9 Claims, 6 Drawing Sheets

(51) Int. Cl.
  *B29C 45/17* (2006.01)
  *B29C 45/50* (2006.01)
  *B29C 45/76* (2006.01)

(52) U.S. Cl.
  CPC ............ *B29C 45/50* (2013.01); *B29C 45/768* (2013.01); *B29C 2045/776* (2013.01); *B29C 2945/76006* (2013.01); *B29C 2945/76096* (2013.01); *B29C 2945/76187* (2013.01); *B29C 2945/76381* (2013.01); *B29C 2945/76498* (2013.01); *B29C 2945/76595* (2013.01); *B29C 2945/76665* (2013.01); *B29C 2945/76859* (2013.01); *B29C 2945/76862* (2013.01); *B29C 2945/76969* (2013.01)

(58) Field of Classification Search
  CPC .......... B29C 2945/76006; B29C 2945/76096; B29C 2945/76595
  USPC ........................................................ 425/149
  See application file for complete search history.

(56) References Cited

U.S. PATENT DOCUMENTS

| | | |
|---|---|---|
| 2001/0026031 A1 | 10/2001 | Onishi |
| 2002/0192322 A1 | 12/2002 | Tsutsui et al. |
| 2006/0276927 A1 | 12/2006 | Uchiyama et al. |
| 2007/0296102 A1* | 12/2007 | Hofmann ................ B29C 45/77 264/40.1 |
| 2009/0218710 A1* | 9/2009 | Hakoda ................ B29C 45/77 264/40.5 |
| 2014/0228980 A1 | 8/2014 | Ohta et al. |

FOREIGN PATENT DOCUMENTS

| | | | |
|---|---|---|---|
| JP | 62-174126 A | 7/1987 | |
| JP | S62-261419 A | 11/1987 | |
| JP | 2-141221 A | 5/1990 | |
| JP | 2-274522 A | 11/1990 | |
| JP | H08-244078 A | 9/1996 | |
| JP | 9-277329 A | 10/1997 | |
| JP | 09277325 A * | 10/1997 | ............ B29C 45/77 |
| JP | H10-235704 A | 9/1998 | |
| JP | 10-323875 A | 12/1998 | |
| JP | 10323875 A * | 12/1998 | ........... B29C 45/766 |
| JP | 2000-167892 A | 6/2000 | |
| JP | 2001-018271 A | 1/2001 | |
| JP | 2001-277322 A | 10/2001 | |
| JP | 2002-200657 A | 7/2002 | |
| JP | 2006-56270 A | 3/2006 | |
| JP | 2006-334929 A | 12/2006 | |

OTHER PUBLICATIONS

Machine Translation of JP-10323875-A (Year: 1998).*
Office Action in JP Application No. 2015-042809, dated Feb. 28, 2017.
Office Action in DE Application No. 102016002521.2, dated Oct. 10, 2018, 10pp.

* cited by examiner

| | | | |
|---|---|---|---|
| DWELL CONTROL C1 | INJECTION PRESSURE CONTROL | 10MPa | 0.1 SECOND |
| DWELL CONTROL C2 | IN-MOLD PRESSURE CONTROL | 10MPa | 0.2 SECONDS |
| DWELL CONTROL C3 | INJECTION PRESSURE CONTROL | 5MPa | 0.5 SECONDS |
| DWELL CONTROL C4 | IN-MOLD PRESSURE CONTROL | 5MPa | 0.7 SECONDS |

PRESSURE CONTROLLER FOR INJECTION MOLDING MACHINE

RELATED APPLICATIONS

The present application claims priority to Japanese Patent Application Number 2015-042809, filed Mar. 4, 2015, the disclosure of which is hereby incorporated by reference herein in its entirety.

BACKGROUND OF THE INVENTION

1. Field of the Invention

The present invention relates to injection molding machines, and more particularly, to a pressure controller for an injection molding machine.

2. Description of the Related Art

An in-line screw injection molding machine performs a measurement step, an injection step, and a dwell step. In the measurement step, a screw in a heating cylinder is rotated while the screw is moved backward to press and send a molten resin to a tip portion of the heating cylinder, and then, in the injection step and the dwell step, the screw is moved forward to fill a mold with the molten resin.

In the injection step, the screw is moved forward based on an injection stroke and an injection speed set in advance to fill the mold with the molten resin in the heating cylinder. When the screw is moved to an injection/dwell switching position, the injection step is switched to the dwell step. In the dwell step, pressure control is performed based on a dwell pressure and a time period set in advance to fully fill the mold with the molten resin and also to compensate for sink marks on molded articles due to shrinkage of the resin.

In thin-wall molding, a high peak pressure is produced when the resin is injected into a cavity at a high speed to fill the cavity in a short time. If the high peak pressure is not reduced immediately, stress deformation may occur in the molded article, and may result in a defective product. In a known art, a pressure from a resin to a screw is detected by a load cell in the dwell step, and the pressure is controlled to become a set pressure.

In the known art, although the control for reducing the pressure on the screw can be performed, the pressure in the mold is not always the same as the pressure to the screw. Consequently, it is difficult to reduce the pressure in the mold to a desired pressure at a desired response speed.

Figure 8:
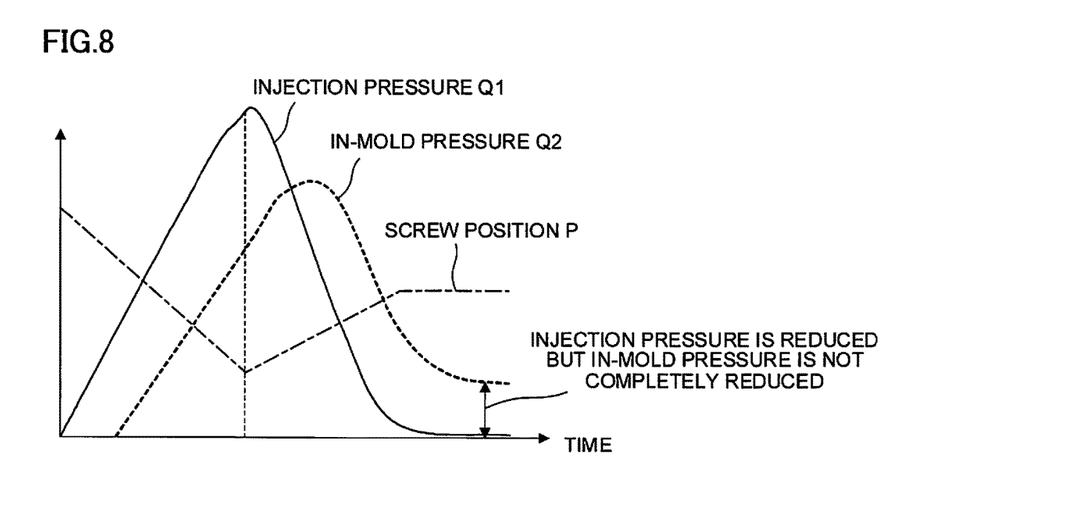
FIG. 8 is a graph showing time transition of injection pressure and pressure in a mold in one molding cycle in the molding processing by an injection molding machine including a pressure controller according to the known art.

FIG. 8 is a graph showing time transition of injection pressure Q1 and pressure Q2 in a mold in one molding cycle in the molding processing by an injection molding machine including a pressure controller according to a known art. FIG. 8 shows a problem that the injection pressure Q1 is reduced, but the pressure Q2 in the mold is not completely reduced. In the graph, reference numeral P indicates a screw position.

Japanese Unexamined Patent Application Publication No. 62-261419 discloses a technique for controlling a pressure detected by a pressure sensor provided in a mold to become a predetermined pressure. However, it is necessary to provide the additional pressure sensor in the mold, and this increases the cost.

Japanese Unexamined Patent Application Publication No. 2000-167892 discloses a technique of providing a step for moving a screw backward by speed or position control in the latter half of a filling step, and after the completion of the filling step, performing pressure control in a dwell step.

Japanese Unexamined Patent Application Publication No. 2001-277322 discloses a technique in which, in a filing step in injection molding, a screw is moved forward to a predetermined position and moved back to a set position at a set speed for depressurization just before V-P switching. However, all of the above techniques describe to simply move the screw backward by the position control for depressurization in the latter half of the filling step, and there is a problem that it is difficult to reduce the pressure in the mold at a desired response speed.

Japanese Unexamined Patent Application Publication No. 10-235704 discloses a technique for storing a value of driving pressure of an injection screw detected in injection of a molten material in a mold-open state. Based on a difference between a driving pressure of the injection screw detected in real time during the molten material injection in a normal filling state in which the mold is closed and the driving pressure of the injection screw stored in advance, a pressure in the mold in the normal filling operation is estimated. However, injecting the molten material in the mold-open state may damage the mold.

Japanese Unexamined Patent Application Publication No. 2001-18271 discloses a technique for applying a dwell pressure based on a dwell pressure target value and detecting a resin pressure at a gate side and a resin pressure at an opposite side of the gate in a mold cavity in a dwell step. If the resin pressure at the opposite side of the gate starts to decrease, the pressure is controlled such that the resin pressure at the gate side becomes the same resin pressure at the opposite side of the gate. However, it is necessary to provide an additional pressure sensor in the mold, and this increases the cost. Further, there is a possibility that the pressure control for controlling the resin pressure at the gate side to become the same pressure as the resin pressure at the opposite side of the gate is not always suitable for the thin-wall molding.

Japanese Unexamined Patent Application Publication No. 8-244078 provides a first pressure sensor for detecting a resin reaction force acting on a screw or a pressure in a cylinder and a second pressure sensor for detecting a pressure in an injection mold. Until the resin reaches the second pressure sensor, feedback control of the injection pressure is performed based on a set resin reaction force or a set pressure in the cylinder and the current pressure detected by the first pressure sensor. After the resin reaches the second pressure sensor, the feedback control of the injection pressure is performed based on a set pressure in the injection mold and the current pressure detected by the second pressure sensor. However, it is necessary to provide the additional pressure sensors in the mold, and this increases the cost.

SUMMARY OF THE INVENTION

An object of the present invention is to provide a pressure controller for an injection molding machine capable of controlling an injection pressure after injection dwell switching to become a set pressure by an injection pressure control unit to reduce variations of pressure in a mold in molding cycles and to provide molded articles of stable quality. Another aspect of the invention is to provide a pressure controller for an injection molding machine capable of performing control such that an estimated in-mold pressure becomes a set in-mold pressure to control the pressure in the mold at a high response speed, and immediately reduce the pressure in the mold to prevent stress deformation of molded articles. Another aspect of the invention is to provide a pressure controller for an injection molding machine capable of controlling an injection pressure or an estimated in-mold pressure to control the pressure in the mold more accurately.

A pressure controller for an injection molding machine according to an aspect of the invention includes an injection screw drive unit for driving an injection screw, an injection pressure detection unit for detecting an injection pressure, a screw movement amount detection unit for detecting an amount of movement of the injection screw, a screw speed control unit for controlling a movement speed of the injection screw in an injection step, an injection dwell switching unit for switching from the injection step to a dwell step, and an injection pressure control unit for controlling the injection pressure in the dwell step after the injection dwell switching. The pressure controller includes an in-mold pressure estimation unit for estimating a pressure in a mold based on the injection pressure detected with the injection pressure detection unit, and the amount of movement of the screw detected with the screw movement amount detection unit, and an in-mold pressure control unit for controlling such that the estimated in-mold pressure becomes a set in-mold pressure after the pressure control is performed in the dwell step with the injection pressure control unit.

The in-mold pressure estimation unit may estimate the in-mold pressure based on the injection pressure if the detected injection pressure is equal to a predetermined value or more, and estimate the in-mold pressure based on the detected screw movement amount if the injection pressure is smaller than the predetermined value.

The pressure controller may include an in-mold pressure control switching determination unit for determining whether to switch from the injection pressure control with the injection pressure control unit to the in-mold pressure control with the in-mold pressure control unit. Determination conditions of the in-mold pressure control switching determination unit may include at least one of an elapsed time of the injection pressure control with the pressure control unit, the elapsed time reaching a switching time, and an injection pressure in the injection pressure control with the injection pressure control unit, the injection pressure reaching a switching pressure.

A set pressure of the injection pressure control unit may be equal to the set in-mold pressure of the in-mold pressure control unit.

The in-mold pressure control unit may perform proportional-integral-derivative (PID) operation based on a deviation between the estimated in-mold pressure and the set in-mold pressure to control the screw speed or the screw drive torque.

The pressure controller may include a pressure control unit for controlling the injection pressure or the estimated in-mold pressure soon after the in-mold pressure control is performed with the in-mold pressure control unit. The pressure control unit may select which one of the injection pressure and the estimated in-mold pressure is to be controlled.

The pressure controller may include a setting screen on which the set in-mold pressure can be set.

The pressure controller may include a setting screen on which at least one of the switching time and the switching pressure among the determination conditions of the in-mold pressure control switching determination unit can be set.

The pressure controller may include a setting screen on which one of the injection pressure and the estimated in-mold pressure to be controlled in the pressure control unit can be selected.

According to the aspects of the invention, the injection pressure after the injection dwell switching is controlled to become a set pressure by the injection pressure control unit, and thereby pressure variations in the mold in the molding cycles can be reduced. Consequently, molded article of stable quality can be provided.

Further, by controlling the estimated in-mold pressure to become a set in-mold pressure, the pressure in the mold can be controlled at a high response speed. Consequently, the pressure in the mold can be immediately reduced, and stress deformation of molded articles can be prevented.

Further, by controlling the injection pressure or the estimated in-mold pressure, the pressure in the mold can be more accurately controlled.

BRIEF DESCRIPTION OF THE DRAWINGS

The above and other objects, features of the present invention will become apparent from the following description of an embodiment with reference to the attached drawings, in which.

DETAILED DESCRIPTION OF THE PREFERRED EMBODIMENT

Hereinafter, an embodiment of the present invention will be described with reference to the attached drawings.

Figure 1:
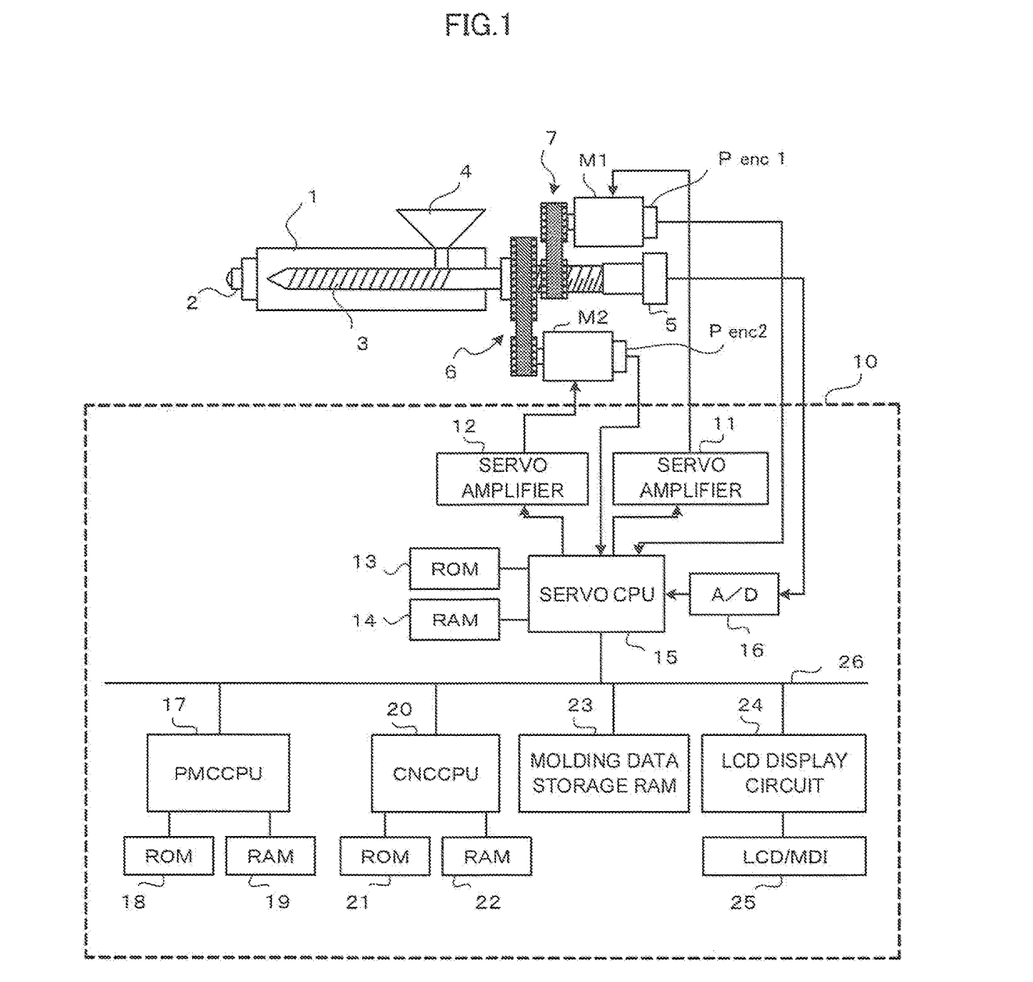
FIG. 1 is a schematic block diagram of an injection molding machine and a controller for controlling the injection molding machine.

FIG. 1 is a schematic block diagram of an injection molding machine and a controller for controlling the injection molding machine. Into a cylinder 1, a screw 3 is inserted. To the tip of the cylinder 1, a nozzle 2 is attached, and on a side part in a rear end of the cylinder 1, a hopper 4 for supplying resin pellets to the cylinder 1 is attached. The screw 3 is driven in its axial direction to perform injection and back pressure control by an injection servomotor M1 that serves as a drive unit for driving the screw 3 in its axial direction, a power train, and a conversion mechanism 7 that converts rotary motion into rectilinear motion such as a ball screw and a nut. The screw 3 is also driven to rotate by a servomotor M2 that serves as a rotation drive unit for rotating the screw 3, and a power train 6 including a belt, a pulley, and the like.

To the injection servomotor M1 and the screw rotation servomotor M2, a position/speed detector Penc1 and a position/speed detector Penc2 for detecting their rotation positions and rotation speeds are attached respectively. With the position/speed detectors Penc1 and Penc2, a position (position in the screw axial direction) of the screw 3, a moving speed (injection speed), and a rotation speed of the screw 3 can be detected. Further, a pressure sensor 5 such as a load cell for detecting a pressure applied from a molten resin onto the screw 3 in the screw axial direction is provided.

A controller 10 for controlling the injection molding machine is described. Toa PMC-CPU 17, a read-only memory (ROM) 18 storing a sequence program for controlling sequence operation of the injection molding machine and other data, and a random access memory (RAM) 19 for temporarily storing calculation data and the like are connected. To a CNC-CPU 20, a ROM 21 storing an automatic operation program for performing overall control of the injection molding machine and other data, and a RAM 22 for temporarily storing calculation data and the like are connected.

To a servo CPU 15, a ROM 13 storing a control program dedicated to servo control for performing a position loop, a speed loop, and a current loop, and a RAM 14 to be used to temporarily store data are connected. To the servo CPU 15, a servo amplifier 12 for driving the screw rotation servo motor M2 based on an instruction from the servo CPU 15 and a servo amplifier 11 for driving the injection servo meter M1 are also connected. To the servomotors M1 and M2, as described above, the position/speed detectors Penc1 and Penc2 are attached respectively. The output from the position/speed detectors Penc1 and Penc2 is fed back to the servo CPU 15.

The servo CPU 15 drives and controls each of the servo amplifiers 11 and 12 by controlling position/speed feedback based on an instruction for each shaft (the injection servo motor M1 or the screw rotation servo motor M2) to move, the instruction issued from the CNC-CPU 20, and detected positions and speeds fed back from the position/speed detector Penc1 and the position/speed detector Penc2, and also performing current feedback control.

A current position register is provided in the RAM 14. The current position register calculates a forward position (a position in the axial direction) of the screw 3 based on a position feedback signal from the position/speed detector Penc1, and a screw position can be detected using the current position register. To the servo CPU 15, a resin pressure (a resin pressure applied to the screw) is input. The resin pressure is obtained by converting a detection signal (analog signal) in the pressure sensor 5 into a digital signal with an analog to digital (A/D) converter 16.

A liquid crystal display/manual data input (LCD/MDI) unit 25 is connected to a bus 26 via an LCD display circuit 24. A molding data storage RAM 23 that is a nonvolatile memory is also connected to the bus 26. The molding data storage RAM 23 stores molding conditions and various setting values relating to injection molding operation, parameters, macro variables, and the like.

With the above-described structure, the PMC-CPU 17 controls sequence operation of the whole injection molding machine, and the CNC-CPU 20 distributes movement instructions to the servo motors M1 and M2 of the individual shafts based on an operating program on the ROM 21, the molding conditions stored in the molding data storage RAM 23, and the like. The servo CPU 15 also performs the servo control of the position loop control, the speed loop control, and further the current loop control, the so-called digital servo processing, similarly to the known arts based on the movement instructions distributed to each shaft (the injection servo motor M1 and the screw rotation servo motor M2), and a feedback signal of the positions and speeds detected with the position/speed detector Penc1 and the position/speed detector Penc2, and the like.

Figure 2:
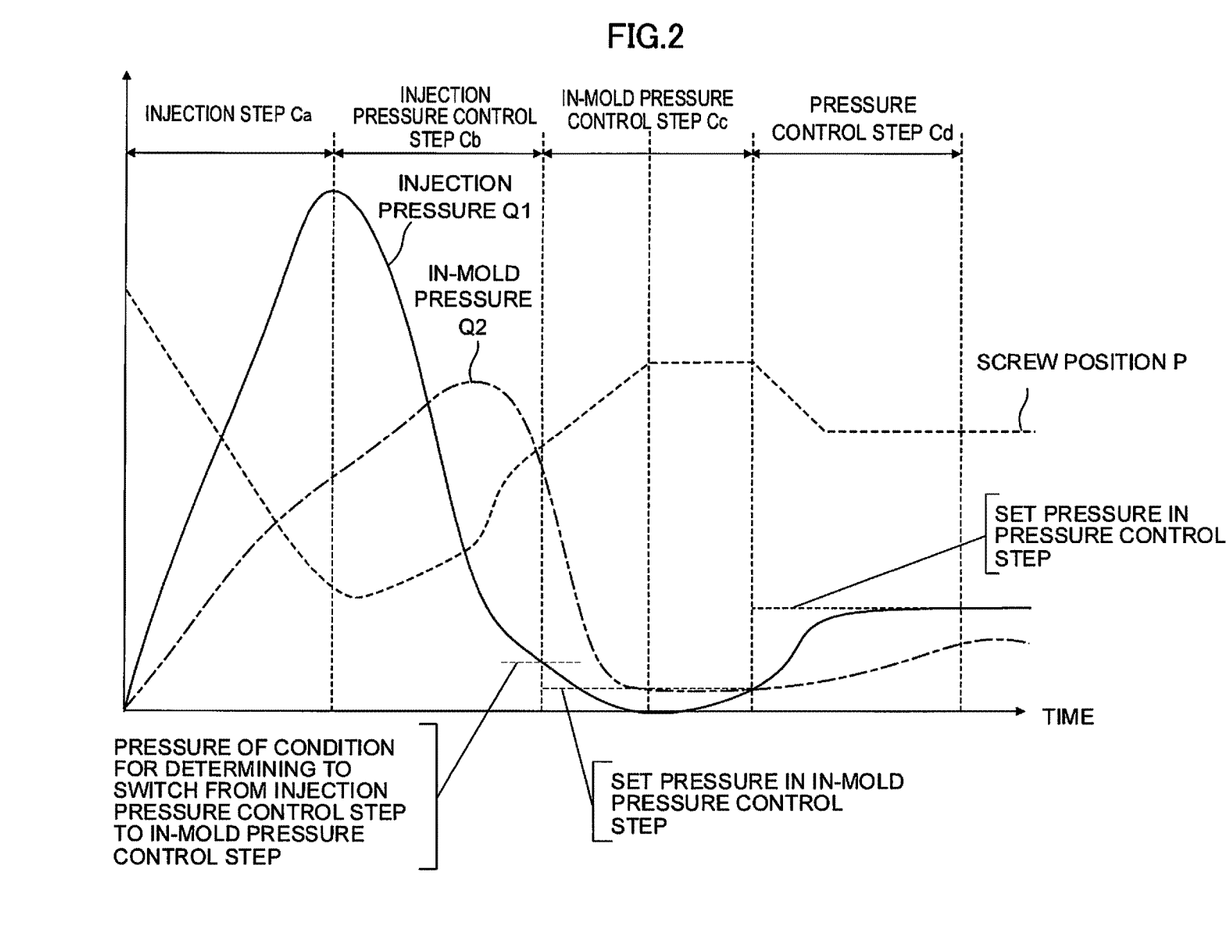
FIG. 2 is a graph showing time transition of injection pressure and pressure in a mold in one molding cycle in the molding processing by an injection molding machine including a pressure controller according to an embodiment of the invention.

With reference to FIG. 2, a method for controlling pressure in a mold at high response speed to be performed by a pressure controller according to the embodiment of the invention for the injection molding machine is described. FIG. 2 is a graph showing time transition of injection pressure and pressure in a mold in one molding cycle in the molding processing by the injection molding machine including the pressure controller according to the embodiment of the invention. The pressure control according to the embodiment of the invention in the injection molding machine is performed by the servo CPU 15 based on an instruction from the CNC-CPU 20 in the controller 10 in FIG. 1.

The controller 10 according to the embodiment of the invention performs a measurement step for rotating the screw 3 in the cylinder 1 while moving the screw 3 backward to press and send a molten resin to a tip portion of the cylinder 1, an injection step Ca for moving the screw forward to fill the mold with the molten resin, and a dwell step including an injection pressure control step Cb and an in-mold pressure control step Cc.

In the injection step Ca, the screw is moved forward based on an injection stroke and an injection speed set in advance to fill a cavity in the mold with the molten resin in the cylinder 1. When the screw is moved to an injection/dwell switching position, the injection step Ca is switched to the dwell step according to the embodiment of the invention.

In the dwell step according to the embodiment of the invention, at least the injection pressure control step Cb for controlling an injection pressure Q1 and after the completion of the injection pressure control step Cb, the in-mold pressure control step Cc for controlling an estimated in-mold pressure Q2 in the mold to become a set pressure are performed. A position of the screw 3 is shown as a screw position P. The dwell step in FIG. 2 shows an example in which a pressure control step Cd is performed after the completion of the in-mold pressure control step Cc.

By performing the dwell step according to the embodiment of the invention, the injection pressure after the injection dwell switching is controlled to become a set pressure through the injection pressure control step Cb, and thereby pressure variations in the mold in the molding cycles can be reduced. Consequently, molded articles of stable quality can be provided. Further, by performing the in-mold pressure control step Cc, the estimated in-mold pressure is controlled to become a set in-mold pressure, and thereby the pressure in the mold can be controlled at a high response speed. Consequently, the pressure in the mold can be immediately reduced, and stress deformation of the molded articles can be prevented. Further, by performing the pressure control step Cd, the injection pressure or the estimated in-mold pressure can be controlled, and thereby the pressure in the mold can be more accurately controlled.

Hereinafter, this embodiment is described in detail.

Figure 3:
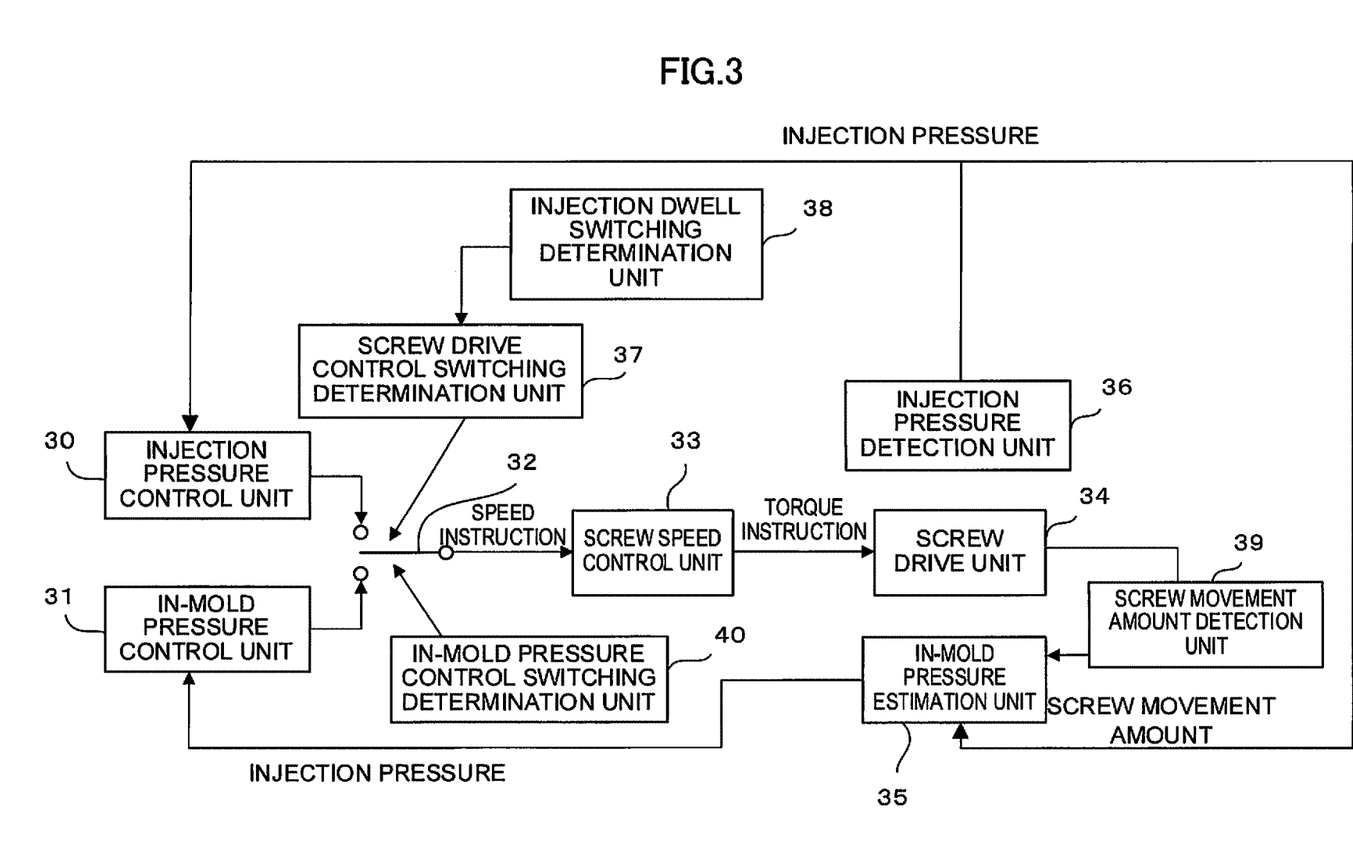
FIG. 3 is a block diagram of a controller for an injection molding machine according to the embodiment of the invention.

FIG. 3 is a block diagram of a pressure controller according to the embodiment of the invention for the injection molding machine. The pressure controller is provided in the injection molding machine that includes the controller 10 in FIG. 1. The pressure controller includes a screw drive unit 34 that drives a screw, a screw movement amount detection unit 39 that detects an amount of movement of the injection screw, an injection pressure detection unit 36 that detects a pressure of the resin in the front of the screw, an in-mold pressure estimation unit 35 that estimates an in-mold pressure based on the detected injection pressure and the detected screw movement amount, a screw speed control unit 33 that controls a movement speed of the screw in the injection step, an injection dwell switching determination unit 38 that switches from the injection step to the dwell step, an injection pressure control unit 30 that controls the injection pressure in the dwell step after the injection/dwell switching, a changeover switch 32 that selects the injection pressure control unit 30 according to an instruction from the injection dwell switching determination unit 38, and an in-mold pressure control unit 31 that controls the in-mold pressure estimated with the in-mold pressure estimation unit 35 to become a set in-mold pressure.

In the injection step Ca shown in FIG. 2, the screw is moved forward based on an injection stroke and an injection speed, which have been set in advance to the screw speed control unit 33 by a control unit at an upper level, to fill the cavity in the mold with the molten resin in the cylinder 1. The injection dwell switching determination unit 38 determines that the screw has reached a switching position when the screw is moved forward to an injection/dwell switching position, and switches the injection step Ca to the dwell step.

A screw drive control switching determination unit 37 selects the injection pressure control unit 30 in response to the switching from the injection step Ca to the dwell step by the injection dwell switching determination unit 38. The injection pressure control unit 30, to which an instruction of a pressure set in advance output from a control unit of an upper level is input, receives a pressure (in other words, injection pressure) of the resin in the front of the screw detected by the injection pressure detection unit 36, and controls such that the injection pressure becomes the predetermined pressure after injection dwell switching.

The injection pressure control unit 30 controls the injection pressure to become the set pressure, and thereby variations in the injection pressures between molding cycles can be prevented. Consequently, molded articles of stable quality can be provided.

The in-mold pressure control unit 31 performs control, after the control of the injection pressure to become the set pressure with the injection pressure control unit 30, such that an estimated in-mold pressure becomes a set in-mold pressure to immediately reduce the in-mold pressure and thereby stress deformation in the molded articles can be prevented. The in-mold pressure control unit 31 may perform PID operation based on a deviation between the estimated in-mold pressure and a set in-mold pressure to control the screw speed or the screw drive torque.

The pressure controller may include an in-mold pressure control switching determination unit 40 that determines whether to switch from the injection pressure control by the injection pressure control unit 30 to the in-mold pressure control by the in-mold pressure control unit 31. Determination conditions for the determination by the in-mold pressure control switching determination unit 40 may include at least one of time elapsed from the start of the injection pressure control to the switching time, and an injection pressure in the injection pressure control that has reached to a switching pressure. The switching time and the switching pressure may be set by an operator. The switching time may be calculated by multiplying an elapsed time in the injection step by a predetermined coefficient.

Further, a pressure control unit (not shown) for controlling an injection pressure or an estimated in-mold pressure corresponding to the pressure control step Cd in FIG. 2 after the in-mold pressure control may be provided. An operator may select which one of the injection pressure and the estimated in-mold pressure is to be controlled in the pressure control unit. Further, the operator may set the set pressure and the set time in the pressure control unit. Further, a plurality of steps of pressure control units may be provided, for example, a pressure control unit of the second step may be provided to control an injection pressure or an estimated in-mold pressure in a way similar to that in the first step after the pressure control of the first step is completed.

The injection pressure detection unit 36 may detect a force the screw 3 receives in its axial direction with a force detector such as a load cell, may detect a resin pressure in the cylinder 1 with a resin pressure sensor, may detect a drive torque of the screw drive unit 34, or may detect an oil pressure if the screw 3 is a hydraulically-powered screw.

The in-mold pressure estimation unit 35 is configured to estimate a pressure in the mold based on an injection pressure detected with the injection pressure detection unit 36, and an amount of movement of the screw detected with the screw movement amount detection unit 39. An in-mold pressure $Q2$ is a pressure at the time an injection pressure $Q1$ generated in the nozzle 2 is transmitted through a flow path in the mold and reaches a runner of the mold or a product part, and the in-mold pressure increases or decreases with increase or decrease of the injection pressure. Consequently, an in-mold pressure may be estimated using an injection pressure as input, and an estimated value of an in-mold pressure as output, and based on an in-mold pressure estimation transfer function having a primary delay element and a dead time element.

While the injection pressure $Q1$ increases after the injection start and the injection pressure $Q1$ becomes zero during decompression, an in-mold pressure $Q2$ is estimated based on the injection pressure $Q1$, whereas the in-mold pressure $Q2$ is estimated based on an amount of movement of the screw because there is no correlation between the injection pressure $Q1$ and the in-mold pressure $Q2$ after the injection pressure $Q1$ becomes zero during decompression. In such a case, the in-mold pressure estimation transfer function is set such that the in-mold pressure $Q2$ increases when the screw moves forward, and the in-mold pressure $Q2$ decreases when the screw 3 moves backward.

Figure 7:
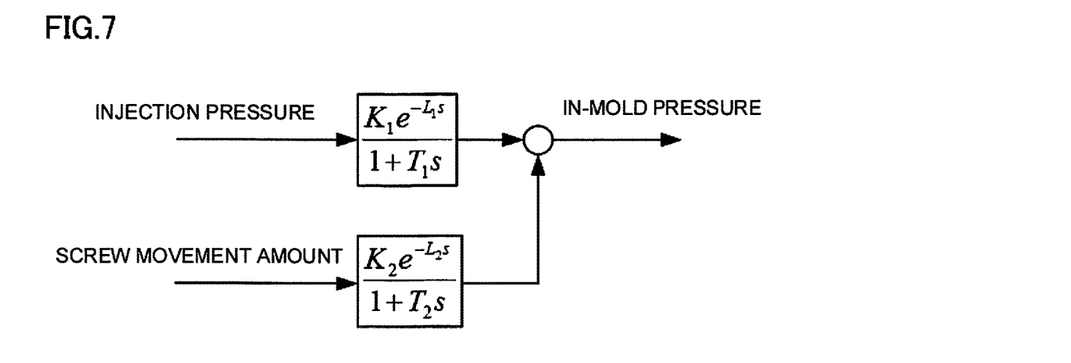
FIG. 7 shows an estimated transfer function of pressure in a mold calculated based on a detected injection pressure, an amount of movement of a screw, and a pressure in the mold.

Alternatively, using a mold that includes an in-mold pressure detection unit, an in-mold pressure estimation transfer function may be calculated based on a detected injection pressure, an amount of movement of the screw, and a pressure in the mold (see FIG. 7).

In such a case, after the calculation of the in-mold pressure estimation transfer function, the in-mold pressure detection unit may be removed from the mold, and pressure control may be performed based on the estimated in-mold pressure. The in-mold pressure estimation transfer function calculated in this operation may be used in molding with the other molds to estimate in-mold pressure.

Figure 4:
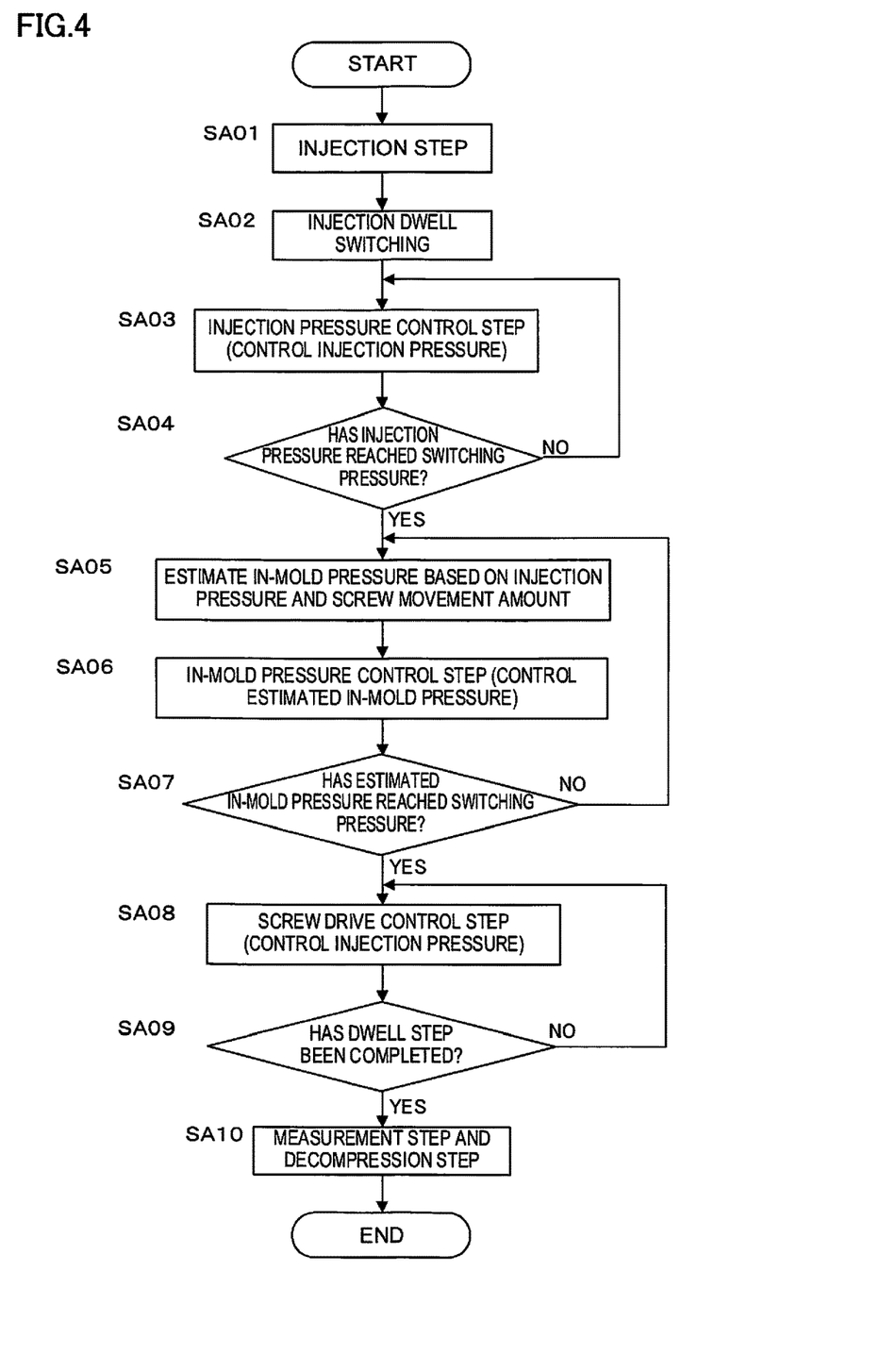
FIG. 4 is a flowchart showing processing according to the embodiment of the invention.

FIG. 4 is a flowchart showing processing according to the embodiment of the invention.

[Step SA01] Perform the injection step.

[Step SA02] Switch from the injection step to the dwell step.

[Step SA03] Perform the injection pressure control step (control of the injection pressure).

[Step SA04] Determine whether the injection pressure has reached the switching pressure. If the injection pressure has reached the switching pressure (YES), proceed to step SA05. If the injection pressure has not reached the switching pressure (NO), return to step SA03.

[Step SA05] Estimate a pressure in the mold based on the injection pressure and the amount of movement of the screw.

[Step SA06] Perform the in-mold pressure control step (control of the estimated in-mold pressure).

[Step SA07] Determine whether the estimated in-mold pressure has reached a switching pressure. If the in-mold pressure has reached the switching pressure (YES), proceed to step SA08. If the in-mold pressure has not reached the switching pressure (NO), return to step SA05.

[Step SA08] Perform the pressure control step.

[Step SA09] Determine whether the dwell step has been completed. If the dwell step has been completed (YES), proceed to step SA10, and if the dwell step has not been completed (NO), return to step SA08.

[Step SA10] Perform the measurement step and decompression step, and ends the processing.

Figure 5:
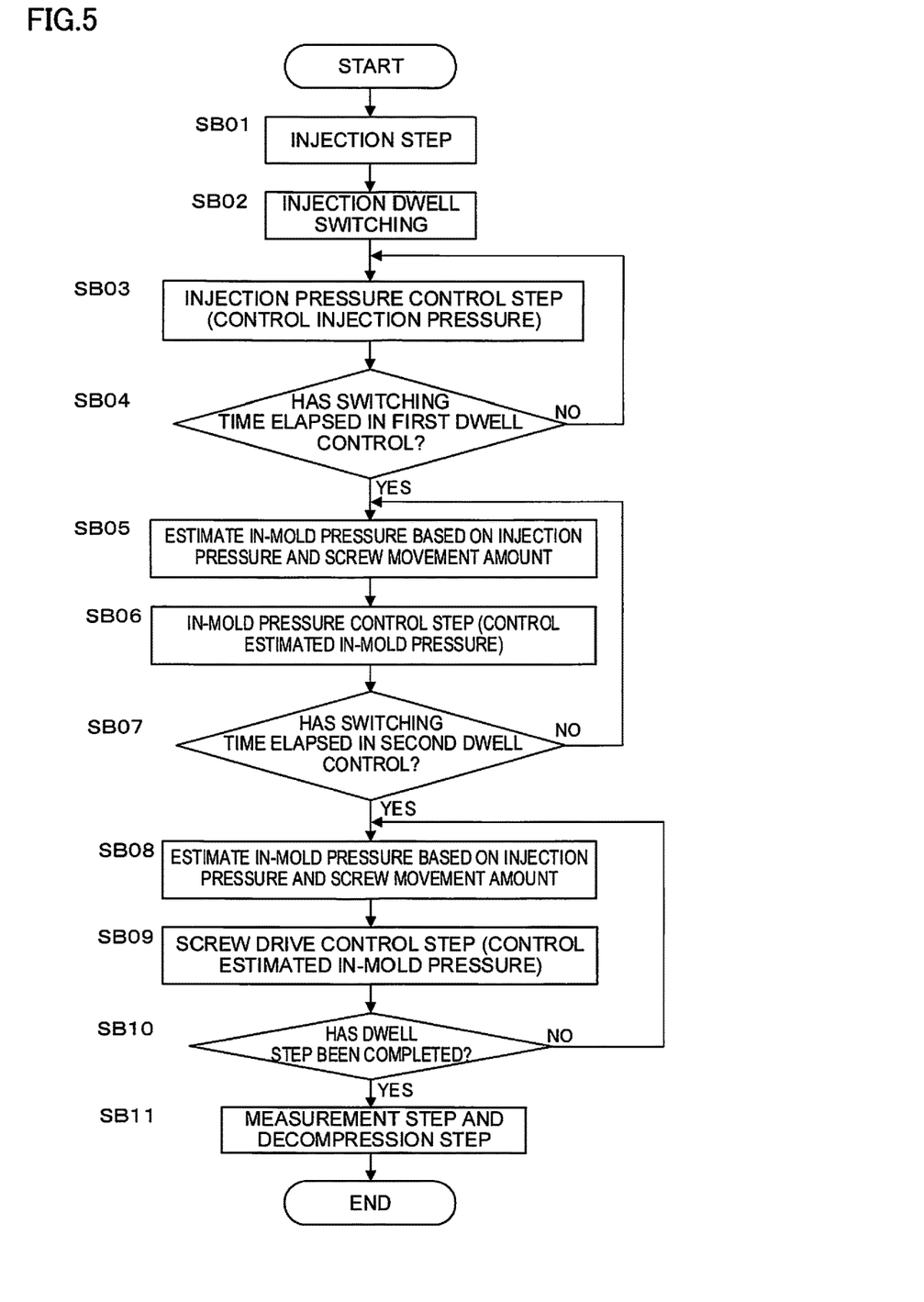
FIG. 5 is a flowchart showing processing according to the embodiment of the invention.

FIG. 5 is a flowchart showing processing according to the embodiment of the invention.

[Step SB01] Perform the injection step.

[Step SB02] Switch from the injection step to the dwell step.

[Step SB03] Perform the injection pressure control step (control of the injection pressure).

[Step SB04] Determine whether the switching time has elapsed in the first dwell control. If the switching time has elapsed (YES), proceed to step SB05. If the switching time has not elapsed (NO), return to step SB03.

[Step SB05] Estimate a pressure in the mold based on the injection pressure and the amount of movement of the screw.

[Step SB06] Perform the in-mold pressure control step (control of the estimated in-mold pressure).

[Step SB07] Determine whether the switching time has elapsed in the second dwell control. If the switching time has elapsed (YES), proceed to step SB08. If the switching time has not elapsed (NO), return to step SB05.

[Step SB08] Estimate a pressure in the mold based on the injection pressure and the amount of movement of the screw.

[Step SB09] Perform the in-mold pressure control step (control of the estimated in-mold pressure).

[Step SB10] Determine whether the dwell step has been completed. If the dwell step has been completed (YES), proceed to step SB11, and if the dwell step has not been completed (NO), return to step SB08.

[Step SB11] Perform the measurement step and decompression step, and ends the processing.

Figure 6:
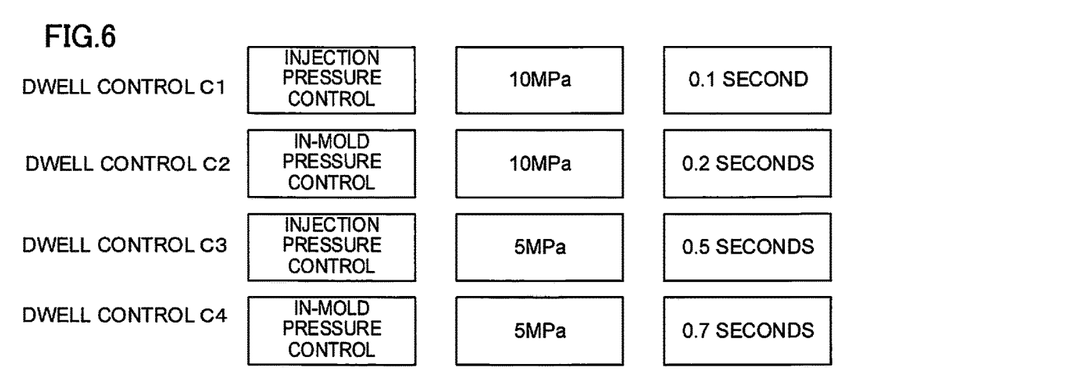
FIG. 6 is an example of a screen for inputting various kinds of setting data to be used in pressure control according to the embodiment of the invention.

FIG. 6 is an example of a screen for inputting various kinds of setting data to be used in the pressure control according to the embodiment of the invention. In the controller 10 in FIG. 1, the screen example is displayed on a display device of the LCD/MDI unit 25. Referring to FIG. 2, the dwell control C1 corresponds to data of injection pressure to be used and time necessary for the step in the injection pressure control step Cb. The dwell control C2 corresponds to data of injection pressure to be used and time necessary for the step in the in-mold pressure control step Cc. The dwell control C3 corresponds to data of a relationship between injection pressure to be used and time necessary for the step in the pressure control step Cd. The dwell control C4 corresponds to an input example of data of injection pressure to be used and time necessary for the step in the in-mold pressure control step Cc.

Although the embodiment of the invention has been described above, the invention is not limited to the above-described embodiment, and other embodiments may be provided by appropriately modifying the embodiment of the invention.

The invention claimed is:

1. A pressure controller configured to control an injection molding machine, the pressure controller comprising:
an injection screw drive unit configured to drive an injection screw;
an injection pressure detection unit configured to detect an injection pressure;
a screw movement amount detection unit configured to detect an amount of movement of the injection screw;
a screw speed control unit configured to control a movement speed of the injection screw in an injection step; and
a processor programmed to
switch from the injection step to a dwell step,
perform injection pressure control to control the injection pressure in the dwell step, after switching from the injection step to the dwell step,
estimate an in-mold pressure in a mold based on
the injection pressure detected by the injection pressure detection unit, and
the amount of movement of the screw detected by the screw movement amount detection unit, and
perform in-mold pressure control such that the estimated in-mold pressure becomes a set in-mold pressure,
wherein, in the dwell step, the processor is programed to
perform the injection pressure control such that the injection pressure detected by the injection pressure detection unit becomes a set injection pressure, and then
in response to the injection pressure in the injection pressure control reaching a switching pressure, switch from the injection pressure control to the in-mold pressure control and perform the in-mold pressure control such that the estimated in-mold pressure becomes the set in-mold pressure, and
wherein the processor is further programmed to,
before the detected injection pressure reaches a predetermined value,
estimate the in-mold pressure based on the injection pressure, and
when the detected injection pressure reaches the predetermined value and a correlation between the injection pressure and the in-mold pressure is eliminated,
estimate the in-mold pressure based on the detected amount of movement of the screw.

2. The pressure controller according to claim 1, wherein the processor is further programmed to switch from the injection pressure control to the in-mold pressure control in response to an elapsed time of the injection pressure control reaching a switching time.

3. The pressure controller according to claim 1, wherein the set injection pressure of the injection pressure control is equal to the set in-mold pressure of the in-mold pressure control.

4. The pressure controller according to claim 1, wherein the processor is further programmed to perform proportional-integral-derivative (PID) operation based on a deviation between the estimated in-mold pressure and the set in-mold pressure to control the speed of the injection screw or a drive torque of the injection screw.

5. The pressure controller according to claim 1, wherein, in the dwell step and after the in-mold pressure control is performed, the processor is further programmed to select which one of the injection pressure and the estimated in-mold pressure is to be controlled next.

6. The pressure controller according to claim 1, further comprising:
a setting screen on which the set in-mold pressure is settable.

7. The pressure controller according to claim 2, further comprising:
a setting screen on which at least one of the switching time and the switching pressure of the in-mold pressure control is settable.

8. The pressure controller according to claim 5, further comprising:
a setting screen on which one of the injection pressure and the estimated in-mold pressure to be controlled by the processor is settable.

9. The pressure controller according to claim 1, wherein the processor is programmed to estimate the in-mold pressure using the injection pressure as input, and based on an in-mold pressure estimation transfer function having a primary delay element and a dead time element.

* * * * *